United States Patent [19]

Sollich

[11] Patent Number: 5,188,853
[45] Date of Patent: Feb. 23, 1993

[54] METHOD FOR CONTINUOUSLY TEMPERING A MASS CONTAINING COCOA BUTTER OR SIMILAR FATS

[75] Inventor: Helmut Sollich, Rabenkirchen, Fed. Rep. of Germany

[73] Assignee: Sollich GmbH, Bad Salzuflen, Fed. Rep. of Germany

[21] Appl. No.: 751,870

[22] Filed: Aug. 28, 1991

[30] Foreign Application Priority Data

Aug. 30, 1990 [DE] Fed. Rep. of Germany ....... 4027429

[51] Int. Cl.$^5$ .............................................. A23G 1/00
[52] U.S. Cl. ................................... 426/231; 426/520; 426/524; 426/660
[58] Field of Search ............... 426/519, 520, 524, 660, 426/231

[56] References Cited

U.S. PATENT DOCUMENTS 4,859,483 8/1989 Sollich ................................ 426/660

Primary Examiner—George Yeung
Attorney, Agent, or Firm—Hopkins & Thomas

[57] ABSTRACT

A method and a device for continuously tempering a mass containing cocoa butter or similar fatty mass to be processed, especially chocolate paste, providing in a tempering machine at least two cooling stories (6, 7) with cooling surfaces (13, 14) and at least one subsequent heating story (8) with heating surfaces (15), the mass being conveyed with a mass input temperature through mass chambers (8) of the cooling stories (6, 7) and the heating story (8) via a pump (17), being first cooled and then heated again. The cooling chambers (10) on the cooling surfaces (13, 14) are being streamed through by a cooling medium in reverse direction and the heating chambers (12) on the heating surfaces (15) by a heating medium. The temperature of the cooling surfaces (14) of the last cooling story (7) facing the heating story (8) is kept constant in at least one crystallization area at the end side independent of changing mass input temperatures and/or mass throughput amounts.

12 Claims, 2 Drawing Sheets

METHOD FOR CONTINUOUSLY TEMPERING A MASS CONTAINING COCOA BUTTER OR SIMILAR FATS

FIELD OF THE INVENTION

The invention relates to a method for continuously tempering a mass containing cocoa butter or similar fatty mass intended for processing, especially chocolate paste, in a tempering machine with at least two cooling stories with cooling surfaces and at least one subsequent heating story with heating surfaces, the paste being conveyed with a paste input temperature via a pump through paste chambers of the cooling story and the heating story and being at first cooled and then heated again, while the cooling chambers on the cooling surfaces are being streamed through by a cooling medium in reverse direction and the heating chambers on the heating surface being streamed through by a heating medium. The invention also shows a device for implementing the method with a tempering column having several superpositioned cooling chambers of at least two cooling stories forming a cylinder, each being connected to a cooling circulation for a cooling medium and heating chambers of at least one heating story being connected to a heating circulation for a heating medium, at the end of the last cooling story facing the heating story a probe being provided to measure the temperature of the paste.

BACKGROUND OF THE INVENTION

A method of the above-described kind is known from EP-A-289 849. In it the paste is stirred with the use of driven stirring tools in the paste chambers. The amount of cooling medium flowing through the cooling chambers is so increased that a turbulent streaming condition results. During a contact-free removal of the mass from the cooling or heating surfaces by means of the stirring tools a shear rate in the line between the cooling or heating surface on the one hand and the stirring tools on the other is used.

The cooling medium continuously streams through the cooling chambers of one or more cooling stories and is conveyed in big amounts through each circulation. Cold water is supplied in a controlled manner to the circulation via a valve, a regulator being applied which is controlled by a probe measuring the temperature of the mass. The cooling medium is guided through the cooling story in reverse direction. By means of this guidance of the cooling medium in cooperation with the substantially increased amount of throughput of cooling water, the disadvantages of an on/off switch of a solenoid valve in a supply line for cold water are avoided. It is however still necessary to regulate the temperature of the cooling medium at the input into the last cooling story facing the heating story in order to meet differing mass throughput amounts and/or mass input temperatures. By way of this the temperature of the cooling surfaces changes depending on the control condition especially in the end area of the last cooling story. The control is so designed that at the end of the last cooling step, i.e. at the transfer into the subsequent heating step, the mass to be tempered shows a substantially constant temperature. A substantially constant mass temperature at the end of the last cooling story is however not equal to a constant portion of crystals in the mass.

DD-PS 136 570 shows a method and a device for continuously tempering chocolate paste with a tempering machine having a cooling story, a dwell story and a subsequent heating story. Each of the three stories is equipped with its own cooling or heating circulation, the cooling chambers or heating chambers are streamed through in parallel flow to the mass chambers. In order to influence the type and size of the forming crystals and in order to temper a chocolate paste in such a way that it is in a state of equilibrium at processing temperature, the paste is successively conveyed through the three stories. The three stories of the tempering machine are formed of about the same size, however, the conveying organ in the area of the second tempering story is altered in comparison to the corresponding areas of the other stories by an enlarged cross section and/or increase in length. In the first story the chocolate paste is cooled off to a certain temperature which is lower than the processing temperature and higher than the critical equilibrium temperature of the instable crystals. This story is the only cooling story. Unstable crystals supposedly cannot form in this cooling story. In the second story, the dwell story, there is no cooling, but the chocolate paste is held in continuous throughput over a comparatively longer period of time at a constant temperature. The constant temperature guide in the dwell story takes place by temperature regulation on the side of the cooling water, so that it is not the temperature of the cooling surface which is kept constant but the temperature of the chocolate paste. This way the chocolate paste is to be transferred into a thermodynamic condition of equilibrium in which a sufficient number of crystals is to form. In the third story, the heating story, the chocolate paste is heated up to processing temperature, here again the temperature being adjusted to the chocolate paste in such a manner that temperature fluctuations of the chocolate paste are avoided if possible. The publication does not contain solutions for solving the problems caused by fluctuating mass throughput and/or changing mass income temperatures.

A further known tempering machine works with a tempering column which is equipped with two cooling stories and one heating story. Each of the two cooling stories is allocated a cooling circulation equipped with a pump; also, a heating circulation driven by a pump is provided for the heating story. Here too the cooling medium is guided in reverse direction through each story. The circulation of the cooling medium and of the heating medium is increased so that a turbulent streaming condition is created. The mass to be tempered is conveyed through the tempering machine with the aid of a pump. In turbulent mixing and in continuous scraping of the cooling surfaces the mass emits or absorbs heat. At the end of each story a probe is provided which measures the temperature of the mass and each triggers a regulator which controls a valve in the cold water supply of the corresponding cooling or heating circulation. The pumps at each circulation of each story continuously circulate the cooling or heating medium. The temperature of the cooling medium automatically adjusts to the cooling needs. By way of this temperature change of the cooling water in dependence of the mass throughput and the mass income temperature, the temperature of the cooling surfaces, especially at the end side of the last cooling story facing the heating story, fluctuates greatly or within wide limits which is not useful for the precrystallization. This results in varying viscosities in the mass to be tempered, and primarily varying portions of stable β-crystals, even though, the temperature of the mass fluctuates within comparatively narrow limits at the end of the last cooling story and hence also at the end of the heating story.

SUMMARY OF THE INVENTION

It is the object of the invention to show a method and a device to continuously temper the mass to be processed which enable the formation of a high content of crystals—especially of stable β-crystals—in a as constant as possible manner, and independent of a fluctuating mass throughput and/or of a changing mass income temperature.

With the above described kind of method this is achieved in accordance with the invention in that the temperature of the cooling surfaces of the last cooling story facing the heating story is kept constant at least in one end sided crystallization area independent of changing mass income temperatures and/or mass throughput amounts. The essential cooling of the mass takes place outside of the last cooling story in the cooling story or stories upstream of the mass. The last cooling story facing the post-heating story becomes a crystallization story in that at least at the end side of this story a crystallization area is created in which the cooling surfaces show an essentially constant temperature, this cooling surface temperature being adjusted to the type of mass and to an optimum formation of crystals. The end side of the crystallization area is annexed to the end of the last cooling story. Its extent within the last cooling story changes. It is bigger with greater throughput amounts and smaller with smaller throughput amounts. This creates at the cooling surfaces optimum conditions for the precrystallization and the corresponding dwelling time of the mass in the crystallization area. The cooling water temperature at this place is therefore not adjusted to the instantaneous cooling needs but is controlled or regulated downwards or upwards. It is obvious that the temperature of the cooling surfaces cannot be kept absolutely constant, but that it fluctuates within very narrow limits of fractions of one degree of Celsius depending on the control or regulating process. With this method according to the invention a constant chocolate viscosity is achieved and the parts of stable β-crystals stay high and constant.

The essential cooling of the mass is realized in the cooling story or stories at the income side, and crystallization is realized essentially in the end side cooling story at approximately constant temperature of this cooling surface. This creates three areas, i.e. cooling stories for cooling, a crystallization story for crystallization and a postheating story for melting open the unstable β-crystals.

The cooling medium in the cooling chambers of the cooling stories is preferably continuously circulated; this way the temperature of the cooling medium in the cooling story or stories at the incoming side is controlled or regulated in dependence of the temperature of the mass at the end of the end sided cooling story. By way of this procedure step it is ensured that in the last cooling story or crystallization story the mass is subject to the crystallization area previewed for it, which leads to the formation of a constant portion of crystals, even with varying mass throughput and with varying mass input temperatures into the first cooling story.

The temperature of the cooling medium of the last cooling story facing the heating story can be kept constant at the entrance into the cooling chambers. For crystallization not the temperature of the cooling medium which is conveyed through the last cooling story in reverse direction is essential, but the temperature of the cooling surfaces which come in contact with the mass in the last cooling story. If however the temperature of the cooling story is more or less constant at this place, it may be assumed that the temperature of the cooling surfaces is also essentially constant.

The temperature of the cooling surface of the last cooling story facing the heating story is adjusted at least in a crystallization area at the end side to a value not exceeding max. 18° C. depending on the type of mass. This value is preset and adjusted based on experimental values in dependence of the type of mass, i.e. especially its composition. For light chocolate the range of 12° to 16° C. is preferable, for dark chocolate or also for low-fat mass the higher range of 15° to 18° C. is recommended.

A device suited for implementing the method functions with a probe which is provided at the end of the last cooling story facing the heating story which measures the temperature of the mass and is characterized in accordance with the invention in that on the probe a regulator is attached for influencing the throughput and/or the temperature of the cooling medium of another preceding cooling story. While according to the state of the art the provided probe is always used only for the control or regulation of the cooling medium of the story in which the probe is arranged, the probe now controls a regulator of another preceding cooling story. This way the last cooling story or cooling zone before the post-heating story or post-heating zone becomes free of cooling work which is now realized in the preceding cooling story or cooling zone, while the last cooling stories or cooling zones fulfills crystallization tasks.

A common cooling circulation driven by a common pump can be provided for the entire cooling stories which branches off between the pump and the inputs into the cooling chambers to the cooling chambers of the single cooling stories; at the input side a modulating valve can be arranged in the branch leading to a preceding cooling story which is connected to the regulator. It is here a valve which does not only have the positions open and closed, but which influences floatingly or in many small steps, for example the throughput in a sensitive and simultaneously floating manner, driven for example by a pulse motor or a similar device. It is however also possible to arrange a modulating valve at this position of the branch to a preceding cooling story which is connected to a supply for cold water. In the last branch leading to the last cooling story no control element must be provided. In connection with the common pump it is possible to connect and operate an installation with extremely low mechanical expenditure. If the modulating valve is developed as an organ controlling the cross section and hence the resistance in the branch to the preceding cooling story, the characteristics of the common pump can be sensibly employed. In case of a sinking throughput of mass or decreasing temperature of mass input, cooling in the preceding cooling stories must be decreased, so that the modulating valve is actuated in direction towards its closed position. This way the pressure at the output side at the common pump increases, and in accordance with the performance characteristic of the pump the throughput of the cooling water through the pump also decreases. Simultaneously, the throughput of the cooling medium in the last cooling story is decreased which takes place in correlation with the desired regulation. It would also be possible, of course, to drive or control the common pump correspondingly.

The modulating valve can also be a motor-controlled throughput valve. A temperature probe for the cooling medium is supplied at the input side of the branch leading to the last cooling medium to which a valve in a supply line to the pump for cold water is connected via a further regulator. Via this control circulation the temperature of the cooling medium which flows through the last cooling story in reverse direction is kept constant. The cooling medium reaches also the other cooling stories with this temperature; here, however, a regulation via the throughput is effected. It is obvious that for an expert also other installations and devices are possible which are suitable for implementing this method.

This way in another device at least for the cooling story at the end side as well as for the preceding cooling story or stories substantially separated cooling circulations can be provided, each driven by a pump; the circulation allocated to the cooling story at the end side has a temperature probe, which is arranged in the cooling medium at the incoming side as well as a further probe and a valve connected thereto in a supply line to the pump for cold water. The further regulator for the temperature of the cooling medium of the preceding cooling story is controlled by a probe at the end of the last cooling story which measures the temperature of the mass. With the application of separated cooling circulations an even more sensitive control can take place. The mechanical expenditure is somewhat higher here than with the use of a single common pump, of course. The cooling stories or cooling zones preceding the last cooling story can again be regulated by a common cooling circulation or by several cooling circulations.

In many embodiments of the device or installation the pump or pumps can be provided as such with constant throughput at turbulent streaming conditions in the cooling medium. Turbulent streaming conditions on the side of the cooling water are useful in any case. Turbulence in the mass movement may also be provided on the mass side, especially with big mass throughputs. Here driven stirring tools can be basically provided in the mass chambers in a rotating manner which take the mass repeatedly from the cooling surfaces in a contactless manner, mix it and level it. This is important especially for the crystallization story.

BRIEF DESCRIPTION OF THE DRAWINGS

In the following, exemplary embodiments of the device suitable for implementing the method are shown.

DETAILED DESCRIPTION

Figure 1:
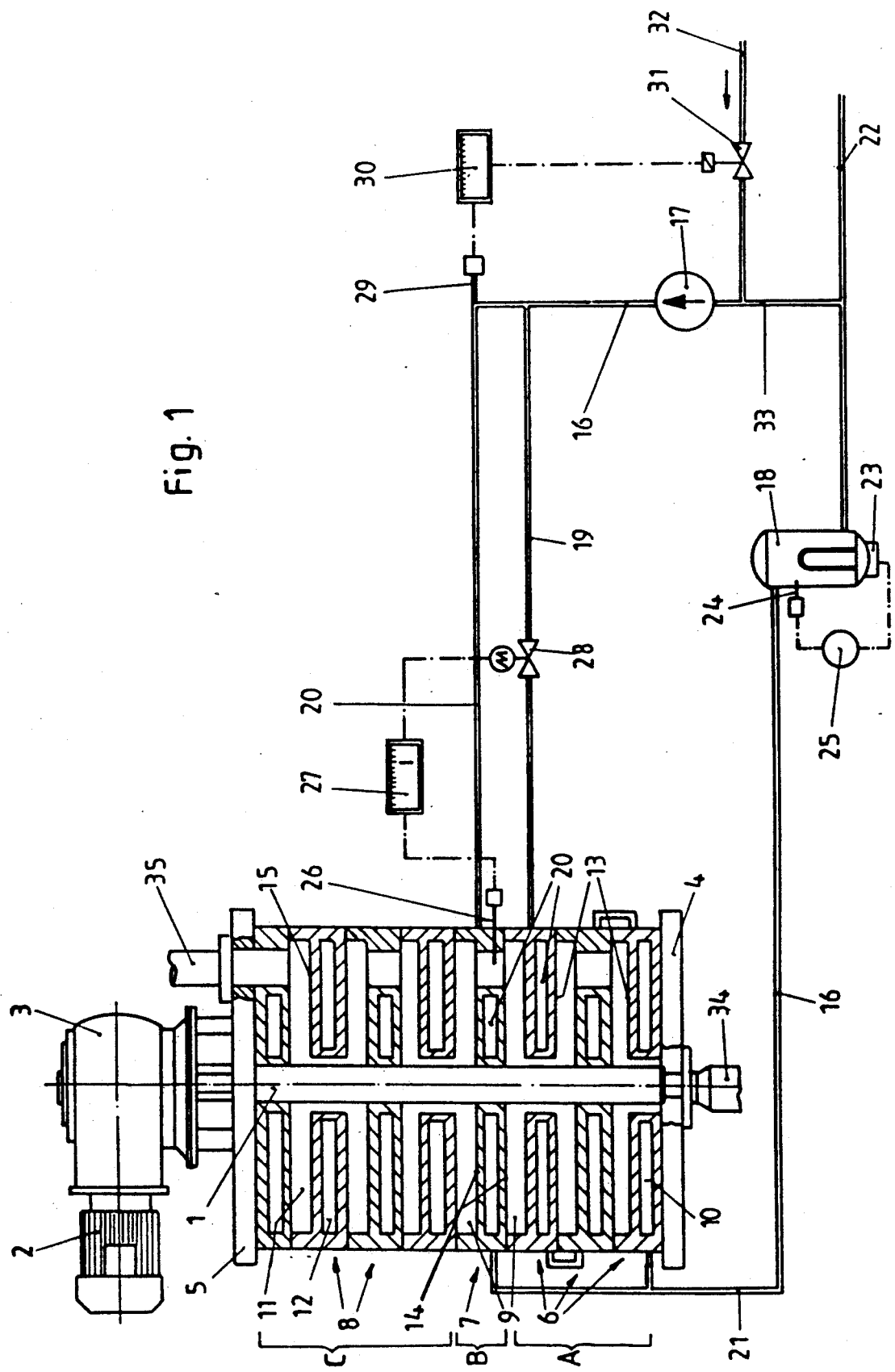
FIG. 1 shows a connection diagram of a first embodiment of the device.

The diagrammatic device in FIG. 1 shows essentially a cylindrical form and is centrally interspersed by a drive shaft 1 which is driven by a motor 2 via a transmission 3. Between a floor plate 4 and a top plate 5 several preceding cooling stories 6 and a last cooling story 7 as well as a heating story 8 are provided. The cooling stories 6, 7 have substance chambers 9 and cooling chambers 10. The heating story 8 has mass chambers 11 and heating chambers 12. It is obvious that the extent and division of the single stories is only represented in an explanatory manner. It is of importance that at least one cooling story 6, a last cooling story 7 and a heating story 8 are provided, and these stories or zones can have varying extents. There can be several cooling stories 6 preceding the last cooling story 7. The single stories or zones can be built up by rings. In the mass chambers 9 and 11 stirring tools are placed (not shown) which take off the mass from the surfaces of the mass chambers during the throughput through the tempering column, mix it and swirl it and thus provide homogenizing. The mass is introduced at the lower end of the tempering column by a mass pump (not shown) into the device and conveyed through it. In the mass there are preferably turbulent streaming conditions.

The mass chambers 9 of the cooling stories 6 and 7 are bordered by the cooling surfaces 13 and 14, the mass chambers 11 of the heating story 8 are bordered by heating surfaces 15.

The flow through the cooling chambers 10 of the preceding cooling stories 6 and the last cooling story 7 is here formed by a common cooling circulation 16 with a common pump 17 and a boiler 18 which branches off in streaming direction of the cooling medium in two branches 19 and 20, the branch 19 being allocated to the cooling stories 6 and the branch 20 to the cooling story 7. The cooling stories 6 and 7 are streamed through in reverse direction, and the cooling medium collects in a common return line 21 which leads back to the boiler 18 and is equipped with an overflow line 22 by way of which excess water is carried off. The boiler 18 is equipped with a heating 23 which is operated in night operation in the position heating and which is operated via a probe 24 and a thermostat 25 in order to create an evenly high temperature.

The heating story 8 is equipped with a heating circuit, which is not shown, similar to the here shown cooling circulation 16. The heating circulation can have a connection with the cooling circulation 16, or it can be supplied completely separate therefrom.

At the end of the last cooling story 7 facing the heating story 8, a probe 26 is provided which measures the temperature of the mass during transfer from the last cooling story 7 into the subsequent heating story 8. The probe 26 is topped with a regulator 27 which regulates a modulating valve 28 in branch 19. It is pointed out with emphasis that the probe 26 is determined for the control of the cooling circulation in the preceding cooling story 6; even though, it is arranged at the end of the last cooling story 7. The modulating valve 28 can be a throughput valve with the help of which the throughput of the cooling medium through the cooling chambers 10 of the cooling stories 6 can be sensitively controlled with the use of a motor.

A probe 29 is provided in the branch 20 for measuring the temperature of the cooling medium at the input into the last cooling story 7. The probe 29 is topped with a further regulator 30 which regulates a valve 31, which can be formed as a solenoid valve. The valve 31 is arranged in a supply line 32 for cold water which at the suction side from the common pump 17 is connected to a line section 33 which leads from the boiler 18 to the pump 17. The regulator 30 serves to keep the input temperature of the cooling water in the cooling stories 6 and 7 as constant as possible. Here it is important that especially the cooling surface 14 of the last cooling story 7 has a constant temperature at the end side, i.e. at the side facing the heating story 8, in a more or less large area, a crystallization area. This temperature is adjusted at the further regulator depending on the type of the mass to be tempered, especially on its composition and desired properties for processing. The adjustment takes place based on experimental values.

The mass to be tempered reaches the tempering column through the mass income 34 with a certain mass input temperature and with a corresponding throughput, it is cooled there at first and then heated again and leaves the installation via mass output 35 from which it is conveyed to a further processing. The mass can have various mass input temperature at the mass income 34, e.g. ranging from 43° to 50° C. At the mass output 35 the mass should have an output temperature of 30° to 33° C. The device according to FIG. 1 is now operated in a manner that the essential cooling of the mass is realized in the preceding cooling stories 6. These cooling stories 6, of which at least one must be provided however also several, are as a whole referred to as cooling zone A. In the downstream last cooling story 7, which can also be built up of several rings or stories and which is referred to in summary as cooling zone B, only little cooling action takes place. The conditions are chosen and harmonized so that a crystallization area K (FIG. 3) is created which ends at the end side, that is at the transfer place between the last cooling story 7 and the subsequent heating story 8, and which more or less extends in reverse direction to the mass throughput over the cooling zone B. This crystallization area of the cooling zone B or the last cooling story 7 is an area in which the temperature of the cooling surfaces 14 are kept as constant as possible at such a low temperature at which a as high percentage of crystals as possible forms in the mass, especially of stable $\beta$-crystals. To the cooling zone B the post-heating zone C is annexed which is formed by the heating story 8 and which may have a surface extent which suitably corresponds to the sum of the cooling surfaces 13 and 14 of the cooling stories 6 and 7, i.e. the cooling zones A and B. In the post heating zone C the instable $\beta'$-crystals in the mass, which have also formed in the crystallization area, are molten up again.

If the temperature and/or the throughput at the mass input 34 increases, this leads at first to an increase of the mass temperature at the transfer between the cooling zone B and the post-heating zone C. This temperature increase is measured by the probe 26 in the mass, and the regulator 27 controls the modulating valve 28 in a manner as to open the valve more, by way of which the resistance in the branch 19 is lowered and more cooling water flows through the cooling zone A. This way the mass in the cooling zone A is cooled in a stronger manner, so that its previously risen temperature is again lowered between the cooling zones A and B to approximately such a value which was present before the increase of the mass input temperature and of the throughput. By lowering the resistance on the pressure side of the pump 17, the throughput of cooling water delivered by it increases according to the performance characteristic of the pump 17, so that the throughput in branch 20 stays about constant. The conditions and especially the temperature of the cooling surface 14 in the area of the cooling zone B however are kept about constant in the crystallization area K at the end side, so that constant conditions concerning an optimum formation of stable $\beta$-crystals in the cooling zone B are further present.

If during a production process the mass input temperature and/or the throughput suddenly drops, this will at first lead to a drop in the mass temperatures at the transfer from cooling zone A to cooling zone B as well as to the post-heating zone C. This too is noticed by the probe 26. The cooling effect in the cooling zone A must be reduced. The regulator 27 regulates the modulating valve 28 in the sense of a throughput decrease of the cooling medium through the branch 19. The modulating valve 28 is therefore comparatively more closed. It shall be pointed out that the circulated amount of water in the cooling zone A and B is still sufficient in order for turbulent streaming conditions to be present on the side of the cooling medium. By way of further closing the modulating valve 28 the throughput cross section is narrowed and the resistance at the output side of the Pump 17 increases, by way of which the pump decreases its conveyed throughput amount. The harmonization of the cross sections and the chosen pump 17 may be such that by such adjustments of the modulating valve 28 the conditions in branch 20 and hence at the cooling surfaces 14 of the cooling zone B and especially of the crystallization zone K do not change. This way it is possible to maintain constant temperatures at the cooling surfaces 14 of the crystallization area or the cooling zone B in spite of changing mass temperatures and changing throughput.

Figure 3:
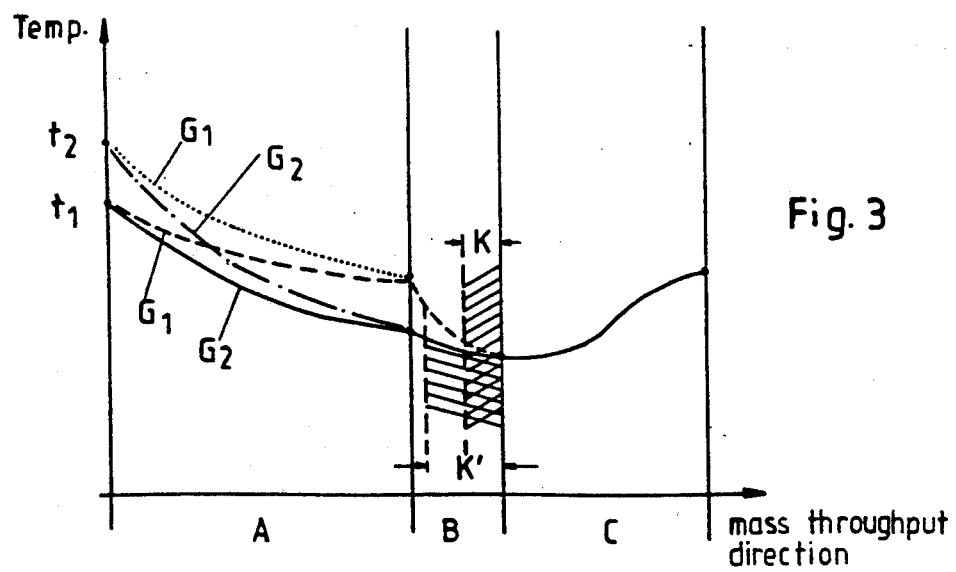
FIG. 3 shows a diagram of the course of the mass temperature in mass flowing direction through the device at different throughputs.

The conditions are again shown in their tendency in FIG. 3. FIG. 3 shows the temperature course over the mass throughput direction in the cooling zones A and B and the subsequent post heating zone C. The continuous line represents a comparatively big mass throughput G2 which could for example be 1000 kg/h at a comparatively low mass input temperature t1. The essential cooling is done in the cooling zone A, so that the temperature difference between the input and the output at the cooling zone B is not extremely great. The crystallization zone K' forming within the cooling zone B has a substantial extent (big mass throughput) and uses up almost the entire cooling zone B. The crystallization zone K' shows a zone in which the temperature of the cooling surfaces 14 is largely constant and in which the mass cools off only minimally, in this area an optimum crystallization growth takes place.

The dash-dotted line also goes for a throughput amount G2, however, with a comparatively higher mass input temperature t2. Here too the essential cooling is done in the cooling zone A, and approximately in such a manner that with this throughput the mass has an identical temperature irrelevant of the mass input temperatures t1 or t2 at the end of the cooling zone A, for example, so that in this case as well the crystallization area K' forms with a relatively great volume.

The dashed and the dotted lines are for a comparatively lower mass throughput G1 which could for example be 500 kg/h. The dashed line is for a lower mass input temperature t1. The dotted line for a comparatively higher mass input temperature t2. Here too the essential cooling is done in the cooling zone A as well as at the input side in the cooling zone B, the transfer temperatures of the mass between the cooling zones A and B being approximately identical. Because of the lower mass throughput the speed of the mass in mass throughput direction is lower, so that the contact or dwell time of the mass in the mass chambers 9 is greater.

Therefore, a comparatively smaller crystallization area K forms in the cooling zone B in which the mass temperature drops only insignificantly and the cooling surfaces 14 are also tempered constantly and to a great extent. It can be seen in FIG. 3 that all curves end at approximately the same temperature point at the transfer between the cooling zone B and the heating zone C and upstream from this point crystallization areas K, K' of various size annex. In the post heating zone C the mass is heated again. This takes place by a separated heating circulation with a corresponding control not shown here.

Figure 2:
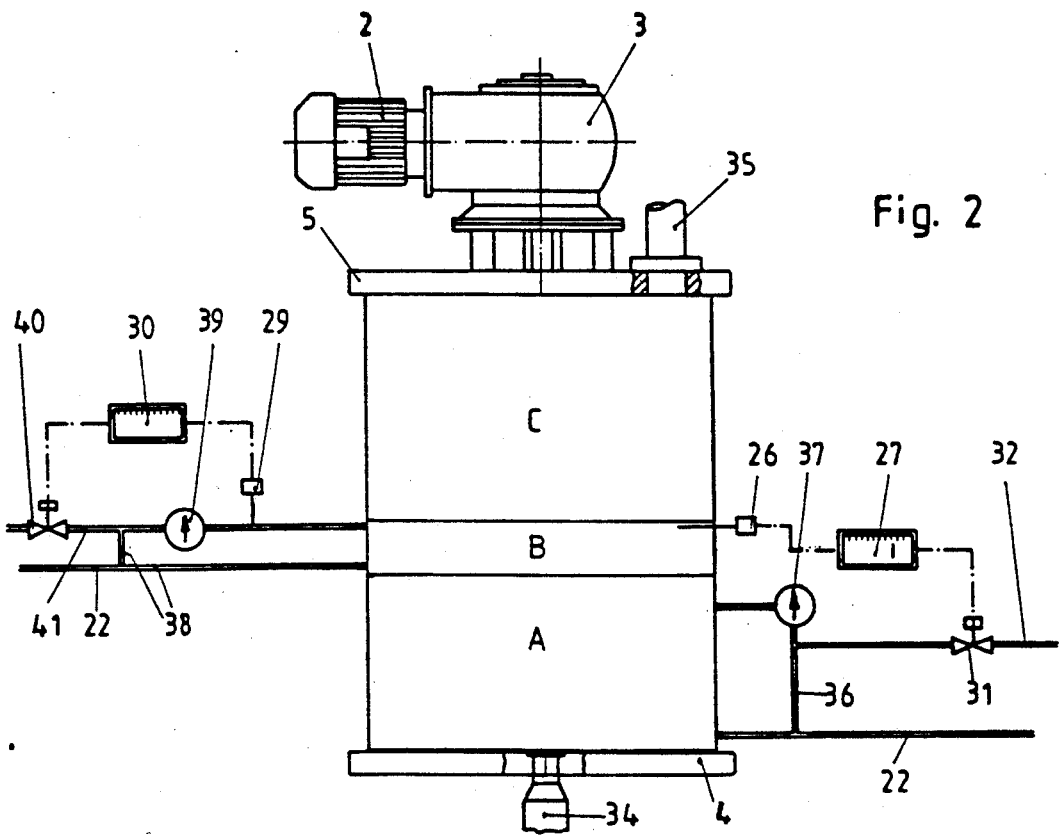
FIG. 2 shows a connection diagram of a second embodiment of the device.

FIG. 2 shows a second exemplary embodiment of the device which in its representation is further shown in diagram. Here the cooling zone A and B and the post heating zone C are represented as in FIG. 1. The cooling zone A, which can consist of at least one but also of several cooling stories 6, is allocated a separate cooling circulation 36. Each cooling story 6 can also be equipped with a separated cooling circulation. In the cooling circulation 36 a pump 37 is arranged which transports the cooling medium in large amounts and with turbulent streaming conditions in reverse direction through the cooling chambers 10 of the cooling stories 6. For reasons of simplicity the boiler as well as further installations are not represented. A supply line 32 for cold water is connected to the cooling circulation 16. In the supply line 32 a valve 31 is arranged which is actuated by a regulator 27 which again is topped by the probe 26 in the mass at the end of the cooling zone B. Each change of the mass temperature at this place is adjusted in that more or less cold water from the supply line 32 is fed into the cooling circuit 36, by way of which the temperature of the cooling medium in the cooling circulation is correspondingly decreased or increased.

A separate cooling circulation 38 with pump 39 is provided for the cooling zone B. The temperature probe 29 senses the input temperature of the cooling medium into the cooling zone B and hence to the cooling surfaces 14 at the end side. By way of the further regulator 30 a valve 40 is controlled in a further supply line 41 for cold water. Excess cooling water which is not pumped in the circulation is extracted from the circulation 38 by way of an overflow line 22. It is obvious that the amount of water drained off via the overflow line 22 corresponds to the amount of water supplied via supply line 41. At the regulator 30, a temperature of the cooling medium of the cooling circulation 38 is also adjusted which is greatly constant and not too high, and hence of the cooling surfaces 14 at the end side at the cooling zone B. The adjusted temperatures are between approx. 14° to 18° C. and are based on experimental values for each mass.

LIST OF REFERENCE:

1 = drive shaft
37 = pump
2 = motor
38 = cooling circulation
3 = transmission
39 = pump
4 = floor plate
40 = valve
5 = top plate
41 = supply line
6 = cooling story
7 = last cooling story
8 = heating story
9 = mass chamber
10 = cooling chambers
11 = mass chambers
12 = heating chambers
13 = cooling surface
14 = cooling surface
15 = heating surface
16 = cooling circulation
17 = pump
18 = boiler
19 = branch
20 = branch
21 = return line
22 = overflow line
23 = heating
24 = probe
25 = thermostat
26 = probe
27 = regulator
28 = modulating valve
29 = probe
30 = regulator
31 = valve
32 = supply line
33 = line section
34 = mass input
35 = mass output
36 = cooling circulation

I claim:

1. A method for continuously tempering a mass containing cocoa butter or similar fats, in a tempering machine with first and second cooling stories (6, 7) having cooling surfaces (13, 14) and at least one subsequent heating story (8) having a heating surface (15), comprising the steps of: pumping the mass having a mass input temperature via a pump through mass chambers (9, 11) of the first and second cooling stories (6, 7) and the heating story (8), cooling the mass in the first and second cooling stories (6, 7) and reheating the mass in the heating story (8), while the mass is cooled and heated, moving a cooling medium through the cooling chambers (10) adjacent the cooling surfaces (13, 14) of the first and second cooling stories, and moving a heating medium through the heating chambers (12) adjacent the heating surface (15) of said heating story (8), and maintaining the temperature of the cooling surfaces (14) of the second cooling story (7) adjacent the heating story (8) at a constant value in at least one crystallization area at the end of the second cooling story (7) for crystallizing the mass independent of changing mass input temperatures and mass throughput amounts.

2. A method as claimed in claim 1, wherein the step of cooling the mass is realized essentially in the first cooling story (6) and the crystallizing of the mass is realized essentially at the end of the second cooling story (7) by maintaining the cooling surface (14) at an approximately constant temperature.

3. A method as claimed in claim 1 and further comprising the steps of recirculating the cooling medium in the cooling chambers (10) of the first and second cooling stories (6, 7), and regulating the temperature of the cooling medium in the cooling chambers (10) of the first cooling story (6) in response to the temperature of the mass at the end of the second cooling story (7).

4. A method as claimed in claim 1 and further comprising maintaining the temperature of the cooling medium of the second cooling story (7) substantially constant in the cooling chambers (10).

5. A method as claimed in claim 1 and further including adjusting the temperature of the cooling surface (14) of the second cooling story (7) in response to the type of mass up to a maximum temperature of 18° C.

6. A method of continuously processing a mass of cocoa butter or similar fats in a tempering machine having a series of cooling stories, each said cooling story including cooling surfaces for cooling the mass, and at least one heating story including heating surfaces for heating the mass, comprising the steps of:

urging the mass in sequence through mass chambers arranged about the series of cooling stories and in contact with the cooling surfaces and through a mass chamber arranged about the heating story and in contact with the heating surface;

cooling the mass as the mass moves through mass chambers adjacent the cooling surfaces of the cooling stories;

maintaining the cooling surfaces of the cooling story adjacent the heating story at a constant temperature low enough for crystallizing the mass independent of mass temperature and mass volume; and reheating the mass as the mass moves adjacent the heating surface through a heating chamber of the heating story to a temperature high enough for melting unstable crystals of the mass without melting stable crystals of the mass.

7. The method of claim 6 wherein the step of maintaining the cooling surfaces at a constant temperature further comprises regulating the temperature of a cooling medium moving adjacent the cooling surface for crystalizing the mass independently of the temperature of a cooling medium moving adjacent the other cooling surfaces of the cooling stories.

8. The method of claim 6 and further including moving the cooling medium through cooling chambers of the cooling stories in a direction generally opposite the direction of flow of the mass.

9. The method of claim 8 and wherein the step of cooling the mass as the mass moves through cooling chambers adjacent the cooling surfaces of the cooling stories further comprises the steps of sensing the temperature of the mass as it is being crystalized and regulating the temperature of the cooling medium at an entrance into the cooling chambers of the cooling stories.

10. The method of claim 6 and further including moving a heating medium through the heating chamber.

11. The method of claim 6 wherein the step of maintaining the cooling surfaces in the crystallization area at a constant temperature comprises adjusting the temperature of the cooling surfaces that crystalize the mass based upon the type of mass being processed.

12. The method of claim 11 wherein the temperature of the cooling surfaces that crystalize the mass is adjusted up to a maximum temperature of 18° C.

* * * * *